(12) United States Patent
Gardner

(10) Patent No.: US 8,559,646 B2
(45) Date of Patent: Oct. 15, 2013

(54) SPATIAL AUDIO TELECONFERENCING

(76) Inventor: William G. Gardner, Medford, MA (US)

(*) Notice: Subject to any disclaimer, the term of this patent is extended or adjusted under 35 U.S.C. 154(b) by 1609 days.

(21) Appl. No.: 11/956,946

(22) Filed: Dec. 14, 2007

(65) Prior Publication Data

US 2008/0144794 A1    Jun. 19, 2008

Related U.S. Application Data

(60) Provisional application No. 60/874,808, filed on Dec. 14, 2006.

(51) Int. Cl.
*H03G 3/00* (2006.01)

(52) U.S. Cl.
USPC .............. 381/63; 381/61; 381/17; 381/310; 379/202.01

(58) Field of Classification Search
USPC ............... 381/61, 63, 77, 82; 379/202.01
See application file for complete search history.

(56) References Cited

U.S. PATENT DOCUMENTS

| | | | |
|---|---|---|---|
| 4,734,934 A | 3/1988 | Boggs et al. | |
| 5,506,954 A | 4/1996 | Arshi et al. | |
| 5,734,724 A | 3/1998 | Kinoshita et al. | |
| 5,991,385 A | 11/1999 | Dunn et al. | |
| 6,125,115 A | 9/2000 | Smits | |
| 6,327,567 B1 | 12/2001 | Willehadson et al. | |
| 6,408,327 B1 | 6/2002 | McClennon et al. | |
| 6,850,496 B1 | 2/2005 | Knappe et al. | |
| 7,012,630 B2 | 3/2006 | Curry et al. | |
| 7,197,126 B2 * | 3/2007 | Kanada | 379/202.01 |
| 7,310,680 B1 * | 12/2007 | Graham | 709/231 |
| 8,112,513 B2 * | 2/2012 | Margulis | 709/224 |
| 2006/0133619 A1 * | 6/2006 | Curry et al. | 381/26 |

OTHER PUBLICATIONS

N. Koizumi, M. Cohen, S. Aoki. "Design of Virtual Conferencing Environment in Audio Telecommunication," Proc. Audio Engineering Society Convention, Preprint 3304, Vienna, 1992.
H. Fouad and J. K. Hahn. "A Framework for Integrating Sound into Virtual Environment Interfaces," IS&T/SPIE Symposium on Electronic Imaging, San Jose, CA, 1994.
V. Hardman and M. Iken. "Enhanced Reality Audio in Interactive Network Environments," Proceedings of the F.I.V.E. Technical Conference, Pisa, Italy, Dec. 1996.
J. Pair and R. Kooper. "COOLVR: Implementing Audio in a Virtual Environments Toolkit," Proc. I.C.A.D., Palo Alto, CA, 1997.
N. Sawhney and C. Schmandt. "Design of Spatialized Audio in Nomadic Environments," Proc. I.C.A.D., Palo Alto, CA, 1997.
M. Billinghurst, J. Bowskill, M. Jessop, J. Morphett. "A Wearable Spatial Conferencing Space," IEEE I.S.W.C., 1998.
C. Low and L. Babarit. "Distributed 3D Audio Rendering," HP Labs Technical Reports, HPL-98-11, 1998.
O. Hodson, S. Varakliotis, V. Hardman. "A Software Platform for Multiway Audio Distribution over the Internet," IEEE Coll. on Audio and Music Tech., 1998.
W. Gardner. "3-D Audio and Acoustic Environment Modeling," Wave Arts white paper, 1999.

* cited by examiner

*Primary Examiner* — Disler Paul
(74) *Attorney, Agent, or Firm* — Bingham McCutchen LLP

(57) ABSTRACT

Embodiments of the present invention allow participants in a networked virtual world to converse naturally as in a real-life situation. Each participant can hear "nearby" participants localized according to their positions in the virtual world, desirably with reverberation and environmental audio effects derived from properties of the virtual world.

5 Claims, 16 Drawing Sheets

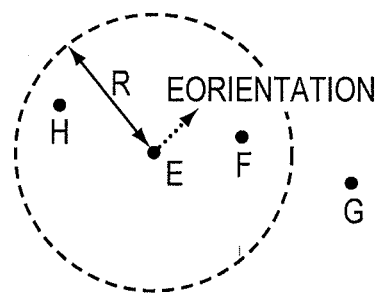 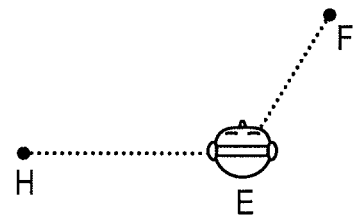
FIG. 3A          FIG. 3B
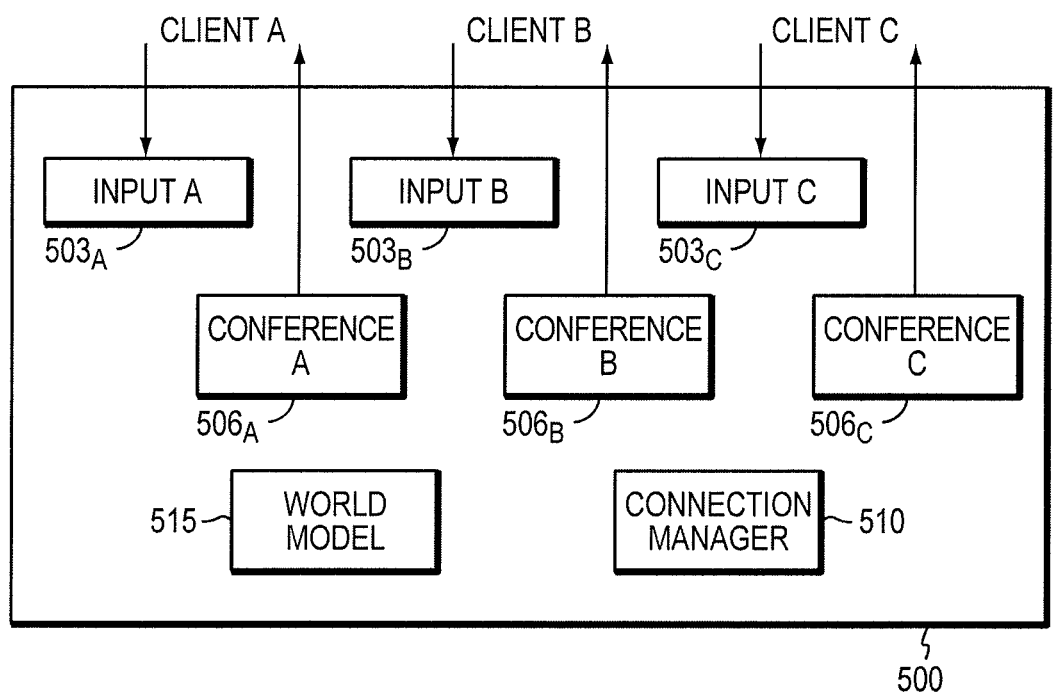
FIG. 5

WORLD MODEL

USER INFORMATION TABLE

| USER | POSITION | ORIENT. | ROOM | TEAM |
|------|----------|---------|------|------|
| A | X, Y, Z | AZ, EL | 1 | RED |
| B | X, Y, Z | AZ, EL | 1 | RED |
| ⋮ | | | | |

ROOM TABLE

| ROOM | REVERB TIME | DUMPING |
|------|-------------|---------|
| 1 | $RT_1$ | $f_1$ |
| ⋮ | | |

USER CONNECTION TABLE

| USER | CONNECTED TO |
|------|--------------|
| A | B, C |
| B | A, C |
| C | A, B |

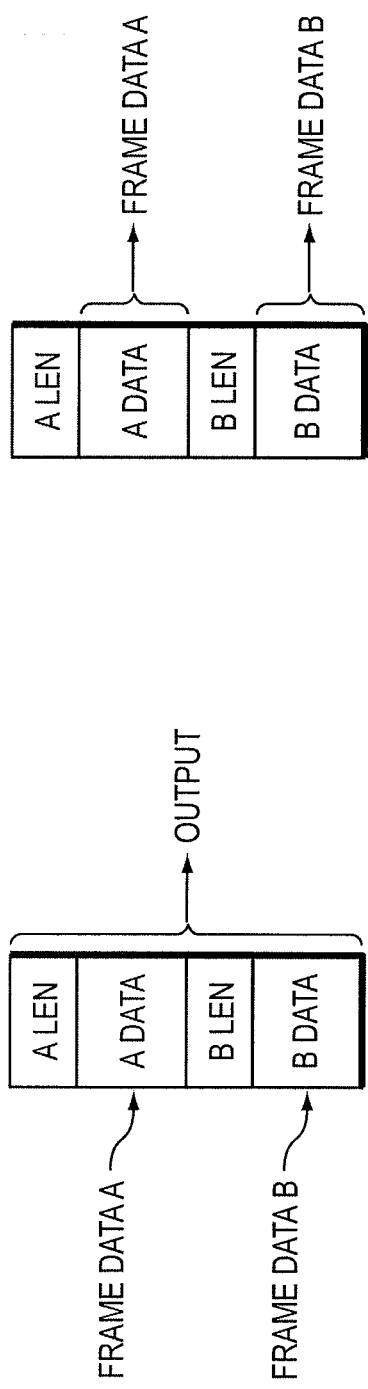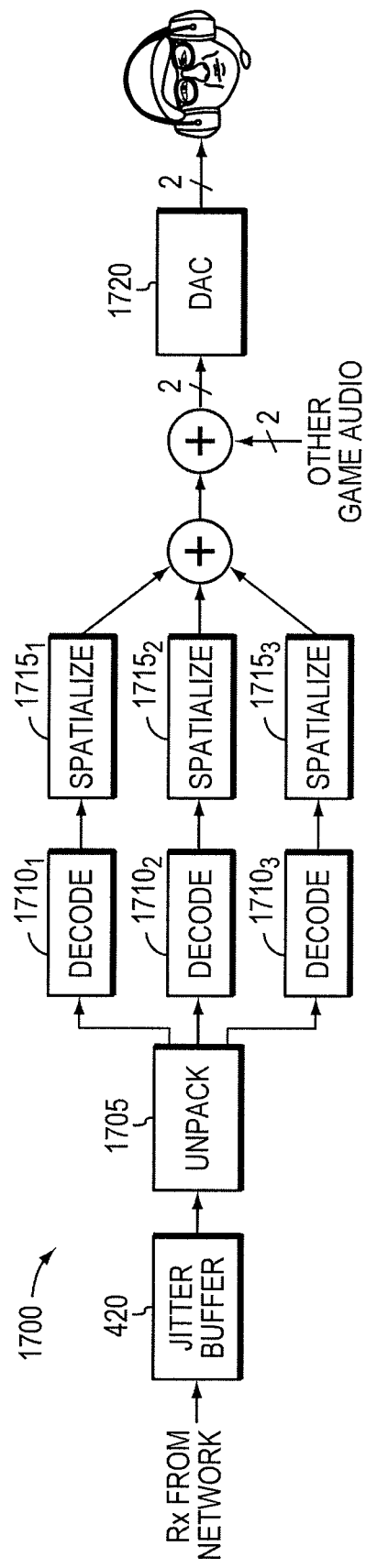

|  | USER | CONNECTED TO | SERVER |
|---|---|---|---|
| USER TABLE | A | B, C, D | 1 |
|  | B | A, C, D | 1 |
|  | C | A, B, D | 2 |
|  | D | A, B, C | 2 |

|  | SERVER | USERS |
|---|---|---|
| SERVER TABLE | 1 | A, B |
|  | 2 | C, D |

USERS: A, B

CONFERENCE A:

| USER | SERVER |
|---|---|
| B | 1 |
| C | 2 |
| D | 2 |

CONFERENCE B:

| A | 1 |
| C | 2 |
| D | 2 |

SPATIAL AUDIO TELECONFERENCING

CROSS-REFERENCE TO RELATED APPLICATIONS

This application claims priority to and the benefit of, and incorporates herein by reference, in its entirety, provisional U.S. patent application Ser. No. 60/874,808, filed Dec. 14, 2006.

BACKGROUND

Audio teleconferences using monaural audio reproduction suffer from several problems. First, when multiple participants are speaking simultaneously there can be a loss of intelligibility. Second, it is difficult to identify the talker unless the listener is familiar with the timbre of the talker's voice. Spatial teleconferencing using binaural or stereo audio reproduction solves these problem by reproducing spatial localization cues. Hence, the listener can use his localization abilities to attend to a single talker in the presence of interfering conversations, commonly called the "cocktail party effect." Also, the listener can more easily identify the talker on the basis of their location.

There are two basic architectures for teleconferencing: client-client and client-server. In a client-client (also called peer-to-peer) architecture, each endpoint client terminal makes a network connection to every other terminal in the conference; hence, there is no centralized server. Client-client architectures are conceptually simple but require increasing network bandwidth at each terminal as each new participant is added to the conference. As a result, they are typically effective for only a small number of participants (e.g., three to four).

In a client-server architecture, by contrast, each endpoint client terminal makes a bidirectional connection to a server. Accordingly, the bandwidth requirements for each terminal do not depend on the number of participants; only the server needs a high bandwidth connection to the network. Furthermore, only a single bidirectional connection is required to add a new participant to the conference. Conventional client-server architectures are appropriate for small to medium-size conferences. A possible disadvantage of client-server architectures over client-client systems is the additional audio latency caused by receiving the audio at the server and retransmitting the audio from the server to the clients.

One emerging application for teleconferencing is three-dimensional (3-D) interactive games, where the player is given a first person viewpoint into a virtual world. These games use 3-D graphics to render a realistic world image, and employ 3-D audio techniques to render spatialized sound with environmental effects to complete the illusion of being immersed in a virtual world. These games may also allow multiple remote players, connected via a network, to compete or collaborate in the virtual world. Each player controls a virtual representation of himself, called an avatar, and can navigate in the virtual world and perform other actions. Recently, massively multiplayer online role-playing games (MMORPGs) that allow large numbers of simultaneous players have emerged.

Techniques for reproducing 3-D audio including spatial localization cues and environmental audio effects are fairly well understood; see, e.g., Gardner, "3-D Audio and Acoustic Environment Modeling," Wave Arts white paper, 1999, available at <www.harmony-central.com/Computer/Programming/3d-audiop.pdf>. Spatial localization cues are reproduced by convolving the sound with a pair of head-related transfer functions (HRTFs), creating a binaural (stereo) signal which is presented to the listener over headphones. If the binaural signal is to be presented to the listener over loudspeakers, it is processed with a crosstalk canceller. Room reverberation can be rendered efficiently using systems of delays with feedback connections, or can be rendered less efficiently but more accurately by convolution with a sampled room response. The distance cue is rendered by varying the level of the sound with respect to the sound of the room reverberation. Discrete echoes off walls can be rendered using a delay to model the air propagation time, a digital equalizer to model the absorption of the wall, and convolution with HRTFs to spatialize the echo. Other environmental audio effects such as source directivity, object occlusion, and air absorption can be modeled using digital equalizers. The Doppler motion effect can be modeled using a variable delay. Three-dimensional interactive games use these techniques to render sounds, reproducing the spatial location, reverberation, and other environmental effects so as to recreate a completely realistic listening situation.

It would be highly advantageous for participants in virtual worlds and interactive games to have the ability to talk with other participants—in essence, to form a teleconference with other participants. However, application of existing teleconferencing technology falls short of a desirable solution. As discussed earlier, monaural teleconferencing suffers from intelligibility and speaker identification problems due to the requirement of locating all speakers at the same position. Furthermore, monaural conferencing is unable to match the perceived location of speakers with their corresponding locations in the virtual world. Spatial teleconferencing techniques have the ability to locate speakers at different positions chosen a priori by a conference administrator, but there is no way to have the positions update dynamically as the listener changes orientation or as the participants move in the virtual space. Furthermore, reverberation, distance cues, and environmental audio effects, which are essential for conveying the sense of a realistic auditory scene, are not provided. Existing techniques do not provide methods for the conferences to be created on the basis of proximity in the virtual world. And, there is no way to handle a large number of simultaneous participants.

DESCRIPTION OF THE INVENTION

Brief Summary

Embodiments of the present invention allow participants in a networked virtual world to converse naturally as in a real-life situation. Each participant can hear "nearby" participants localized according to their positions in the virtual world, desirably with reverberation and environmental audio effects derived from properties of the virtual world. From a conferencing point of view, this strategy achieves the well-known communication benefits of spatial conferencing over monaural conferencing. From an experiential point of view, the invention integrates natural conversation into a virtual world, and provides 3-D audio and environmental audio effects so the conferencing aspect of the virtual world is fully integrated with the other sounds of the world.

Importantly, embodiments of the invention can handle a large number of simultaneous participants. This is possible because each participant need only converse with a relatively small number of proximate participants. As participants move about in the virtual world, they are automatically disconnected from distant participants and connected to nearby participants. Hence, the number of total interconnections required grows linearly as a function of the number of participants, rather than exponentially as in systems where every participant is connected to all other participants. Suppose, for example, that each user can converse with eight other users and there are 1000 users. The present approach would require 8000 interconnections, whereas a fully interconnected conference would require 1,000,000 interconnections. And yet, the ability to converse with a small number of proximate users provides a completely rich and realistic experience.

Embodiments of the present invention include, without limitation, a spatializing single-server architecture with unique listener viewpoints; a spatializing single-server architecture with a shared viewpoint; a non-spatializing server combined with a spatializing client; and a multiple-server architecture, which can scale to different numbers of participants as needed by adding additional servers.

More generally, the present invention relates to audio teleconferencing systems that recreate a sound-field effect of participants in a shared acoustical space. In embodiments involving the application of spatial audio teleconferencing to networked virtual environments, each participant controls a representation of himself or herself in a 3-D virtual world. The virtual world can be created for game play, social interaction, or business collaboration. Embodiments of the invention allow participants in the virtual world to converse with other participants while recreating the acoustics of the virtual world, including localization cues, reverberation, and other environmental audio effects. Participants may converse naturally with other participants who are proximate in the virtual world.

Accordingly, in a first aspect, embodiments of the invention relate to a spatial sound conferencing server comprising an input for receiving audio and position and orientation information from one or more network clients; a processing module for spatializing the audio according to the received position and orientation information; and an output for transmitting the spatialized audio to the at least one network client. In some embodiments, the input receives audio and position and orientation information from a plurality of network clients, and the processing module creates, for each client, a mix of audio from other clients spatialized according to the received position and orientation information. The positional information may, for example, be represented in a world model. Each client may correspond to a user, and for a first client, the associated conference may comprise audio from other clients corresponding to users who are proximate to the first-client user in the world model.

In some embodiments, the conference server includes a connection manager, in operative communication with the processing module, for defining conferences associated with each client; the audio mix transmitted to a client corresponds to a conference associated with that client.

The processing module may comprise means for spatializing the audio by modeling a Doppler motion effect by delaying sound to the first client by a time proportional to a distance between the first-client user and a sound source as represented in the world model; filtering to model object occlusion; scaling by a gain inversely proportional to the distance between the listener and the sound source to model distance cues; filtering by a pair of HRTFs to encode localization cues; and summing the resulting stereo signal with stereo reverberation. In some embodiments the processing module comprises a single spatializer per network client, whereas in other embodiments, the processing module comprises a dedicated spatializer for each participant in each conference handled by the conference server.

In a "blade" server approach, the conference server comprises a plurality of blade servers, each dedicated to one or more conferences and comprising (i) a local world model containing position and orientation information received from participants in the one or more conferences; and (ii) a processing module for spatializing the audio according to the local world model.

In another aspect, the invention relates to a method of spatializing sound. Embodiments include receiving, on a server, audio and position and orientation information from at least one network client; spatializing the audio according to the received position and orientation information; and transmitting the spatialized audio to the at least one network client.

The method may include the steps of receiving audio and position and orientation information from a plurality of network clients and creating, for each client, a mix of audio from other clients spatialized according to the received position and orientation information. The positional information may be represented in a world model. In some embodiments, each client corresponds to a user, and for a first client, the associated conference comprises audio from other clients corresponding to users who are proximate to the first-client user in the world model.

The method of may further comprise the step of defining conferences associated with each client; the audio mix transmitted to a client corresponds to a conference associated with that client. The audio may be spatialized by modeling a Doppler motion effect by delaying sound to the first client by a time proportional to a distance between the first-client user and a sound source as represented in the world model; filtering to model object occlusion; scaling by a gain inversely proportional to the distance between the listener and the sound source to model distance cues; filtering by a pair of HRTFs to encode localization cues; and summing the resulting stereo signal with stereo reverberation.

In still another aspect, embodiments of the invention pertain to a spatial sound conferencing system comprising at least one server and at least one client. The server may comprise an input for receiving audio and position and orientation information from at least one network client and at least one additional sound conferencing server; a processing module for spatializing the audio according to the received position and orientation information; and an output for transmitting the spatialized audio to each network client. Each client may comprise a local world model representing positional and orientation information of a client user; a virtual world engine, responsive to the local world model and output transmitted from the server, for generating audio and video for presentation to the client user; and an output for transmitting the positional and orientation information of the client user to the server.

The positional information may be represented in a world model. The system may also include a connection manager for duplicating the received audio and forwarding the audio to each additional sound conferencing server.

Still another aspect of the invention relates to a method of spatializing sound, embodiments of which include the steps of receiving audio and position and orientation information from at least one network client and at least one sound conferencing server; spatializing the audio according to the received position and orientation information; and transmitting the spatialized audio to the at least one network client.

The positional information is represented in a world model, parameters of which are received from a master server. The received audio may be duplicated and forwarded to at least one additional sound conferencing server. The sound conferencing server to which received audio is forwarded, in turn, may correspond to users proximate, in the world model, to a source of the audio. Embodiments of the method may also include ceasing forwarding the received audtio to a conference server corresponding to a user no longer proximate, in the world model, to the source of the audio.

In yet another aspect, embodiments of a spatial sound conferencing system in accordance with the invention include a plurality of clients connected to a computer network, each client being operable by a user; a master server in network communication with the clients and receiving user positional and orientation information therefrom; and at least one sound conferencing server in communication with the master server and the clients. Each sound conferencing server may itself comprise a local world model comprising positional and orientation information relating to each client's user, and responsive to positional and orientation information received from the master server; an input for receiving audio information originating with a transmitting client; a processing module for spatializing the audio according to the world model; and an output for transmitting the spatialized audio to clients whose users are proximate, in the world model, to the user of the transmitting client.

Still another aspect of the invention pertains to a spatial sound conferencing client. In some embodiments, the client comprises a local world model representing positional and orientation information of a client user and other users; an input for receiving position and orientation information regarding the other users from at least one network server, and audio originating with the other users; a processing module for integrating the received position and orientation information into the local world model; and a processing module for spatializing the received audio according to the received position and orientation information.

In various embodiments, the client further comprises an output for transmitting the positional and orientation information of the client user over the network. The client may include a virtual world engine, responsive to the local world model and the received audio, for generating audio and video for presentation to the client user.

In another aspect, embodiments of the invention relate to a method of spatializing sound including the steps of receiving, on a first client via a computer network, audio and position and orientation information from at least one other client; spatializing, on the first client, the audio according to the received position and orientation information; and presenting the spatialized audio to a user of the first client. Embodiments of the method also include the steps of receiving, via the computer network, audio and position and orientation information from a plurality of other clients and creating a mix of audio from the other clients spatialized according to the received position and orientation information. The positional and orientation information may, for example, be represented on the client in a local world model, and the positional and orientation information of the first client may be transmitted over the network.

Yet another aspect of the invention relates to a spatial sound conferencing system, embodiments of which include at least one client and at least one server. Each client may comprise a local world model representing positional and orientation information of a client user and other users; an input for receiving position and orientation information regarding other the users from at least one network server, and audio from the other users; and a processing module for integrating the received position and orientation information into the local world model; a processing module for spatializing the received audio according to the received position and orientation information; and an output for transmitting the positional and orientation information of the client user over the network. Each server may comprise a routing facility for routing the positional and orientation information, and audio information, from the client to other clients in a conference.

Still another aspect of the invention relates to an article of manufacture having computer-readable program portions embodied thereon for spatializing sound. In some embodiments, the article comprising computer-readable instructions for causing a server to receive audio and position and orientation information from at least one network client; spatialize the audio according to the received position and orientation information; and transmit the spatialized audio to the at least one network client. In other embodiments, the instructions cause a server to receive audio and position and orientation information from at least one network client and at least one sound conferencing server; spatialize the audio according to the received position and orientation information; and transmit the spatialized audio to the at least one network client.

In still other embodiments, the instructions cause a client computer to receive, via a computer network, audio and position and orientation information from at least one other client; spatialize the audio according to the received position and orientation information; and present the spatialized audio to a user.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 3A schematically depicts, from an overhead perspective, the relative positions of four users in a virtual world;

FIG. 3B schematically depicts, from an overhead perspective, the relative positions of a user and conference participants audible to the user;

FIG. 5 schematically illustrates a representative server implementation;

FIG. 15 shows a frame concatenator for a multiple-channel transmission format;

FIG. 16 illustrates unpacking of a frame assembled in accordance with FIG. 15;

FIG. 17 schematically illustrates a client with multi-channel spatialization;

DETAILED DESCRIPTION OF THE PREFERRED EMBODIMENTS

1. General Approach

Figure 1:
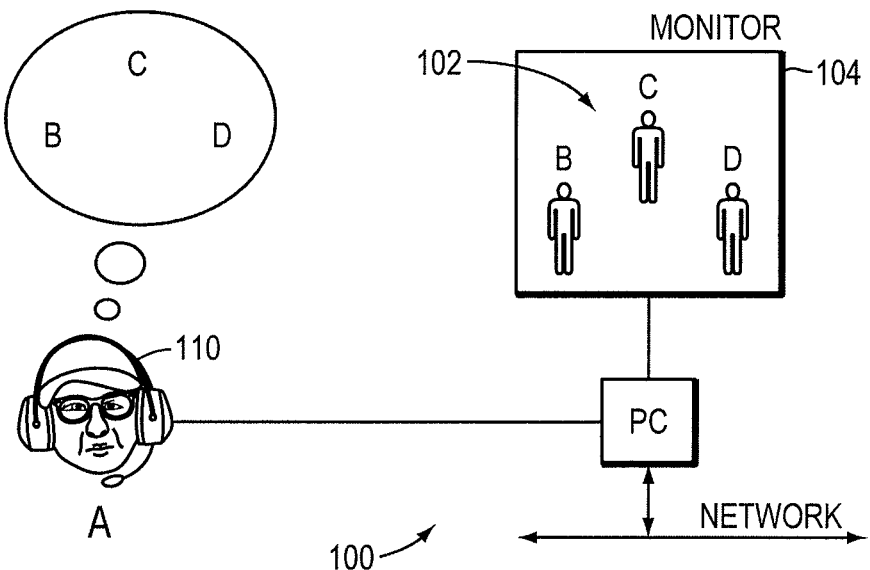
FIG. 1 schematically depicts a generalized virtual-world environment in which the present invention may operate.

FIG. 1 shows a computer user A interacting with a networked virtual environment 100. The user A sees a virtual world 102 displayed on his computer monitor 104, including the representations of other connected users (representatively indicated at B, C, D) and other objects (not shown) in the virtual world. In order to increase the realism and sense of immersion, the audio presented to the user contains spatial cues as to the locations of all sound-emitting objects in the virtual world 102. The spatial audio can be presented over stereo speakers, or preferably, over stereo headphones 110. In FIG. 1, the user A sees the other participants, B, C, and D, and hears the sound of their voices spatialized to correspond to their locations in the virtual world 102. In addition to spatial cues, the sound presented to user A contains environmental audio cues, including reverberation and distance cues. Reverberation suggests the size and character of the enclosing room. Distance cues are provided by the absolute amplitudes of the sounds and their relative amplitudes with respect to the reverberation. Consequently, the virtual environment 102 provides the same acoustical information as a real acoustic situation, and hence the user A can converse with other connected users as if in a natural conversation.

Figure 2:
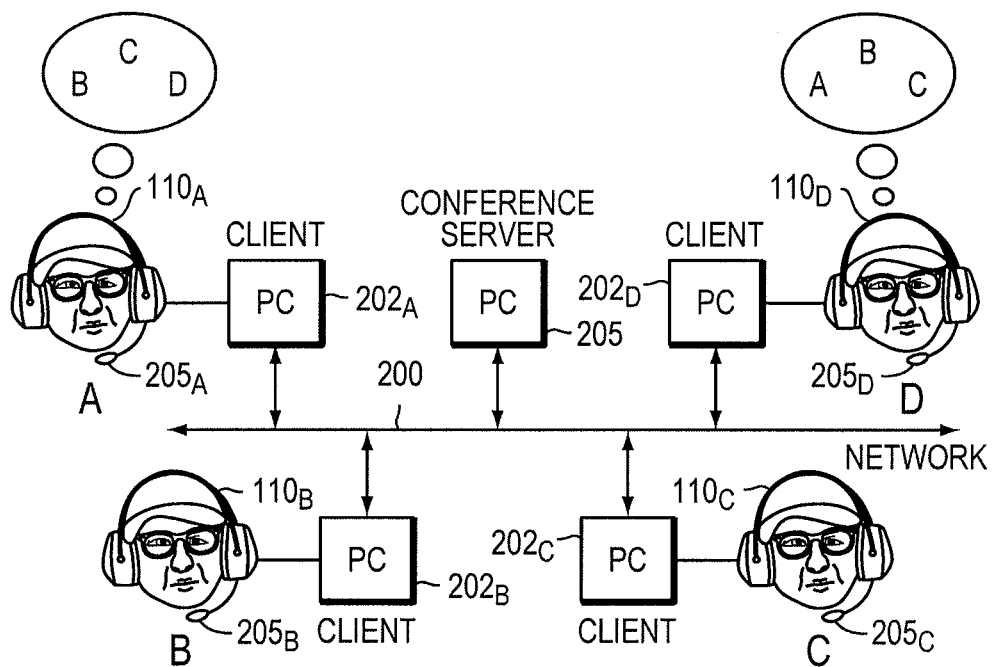
FIG. 2 schematically depicts multiple remote users connected to a virtual world as illustrated in FIG. 1.

As shown in FIG. 2, the remote users A, B, C, and D may be connected to the same virtual world over a shared network 200. Each user is connected via a respective network client 202$_A$, 202$_B$, 202$_C$, 202$_D$, e.g., a personal computer (PC) as illustrated but equivalently a game console, cell phone, or other computational device with networking capability. In the illustrated embodiment, conferencing capabilities are provided by a single conference server 205 also connected to the shared network 200. Each user is presented an individualized conference that contains only other users. However, the client 200 may route some of the signal from the microphone 205 to the headphones 110 with which it is associated in order to indicate to the user that the system is active; in telephones this is called a sidetone signal.

An overhead view of four participants in the virtual world, users E, F, G, and H, appears in FIG. 3A. User E hears only nearby users H and F; user G falls outside a predetermined listening radius R and is deemed to be inaudible to E. The distance cue mechanism, modeled on actual acoustics, causes the amplitudes of sounds to drop off inversely with the distance. In practice, the listening radius R can be chosen to be the distance at which sounds are sufficiently attenuated as to become inaudible.

The users audible to E form a conference specifically for E. It may be necessary or desirable to limit the number of users in a single conference; for example, there may be situations involving densely spaced users where a single user is limited to conference with only a certain number of nearby users. Additionally, it may be desirable to allow certain users to converse with other users even if they are not proximate. For example, in game play, distant users belonging to the same team might converse over virtual walkie-talkies, intercoms, etc. In this case, the sound characteristics of the virtual communication channel may be simulated by suitable audio effects.

As shown in FIG. 3B, the spatial locations of users in E's conference depend on the relative virtual locations of E, F, and H, and the virtual orientation of E. The generated spatial locations will, therefore, change as E changes his orientation or moves about, and will also change if users F and H move. Similarly, the reverberation characteristics of E's conference will depend on the characteristics of the enclosing virtual room, if any. It is also possible to model different reverberation effects if, for example, user H is in a virtual room adjoining E's room, and which has reverberant characteristics different from E's room. In this case, the sound of H's voice can be rendered with a different reverberation.

Additional environmental cues that may be modeled include object occlusion, source directivity, and the Doppler motion effect. Object occlusion refers to the modification of sound caused by an occluding object between the sound and the listener. For example, with continued reference to FIGS. 3A and 3B, if user F is behind a wall but still audible, the sound of her voice can be altered to model the occluding effect of the wall. Source directivity refers to the fact that a source may project sound non-uniformly. For example, a human talker projects low frequencies uniformly in all directions, but high frequencies are transmitted primarily in the direction the talker is facing. The Doppler motion effect is a pitch change of the sound caused by the relative motion of the sound and the listener. This effect is audible only if users are rapidly moving in the virtual world, which might occur in game play if, for example, one of the users is riding a virtual vehicle.

The positions and orientation of users in the virtual world are maintained in a world model, which includes all information as to the current composition of the virtual world. The spatial locations and environmental effects presented to each user should be updated smoothly as the world parameters change.

2. Client Implementation

Figure 4:
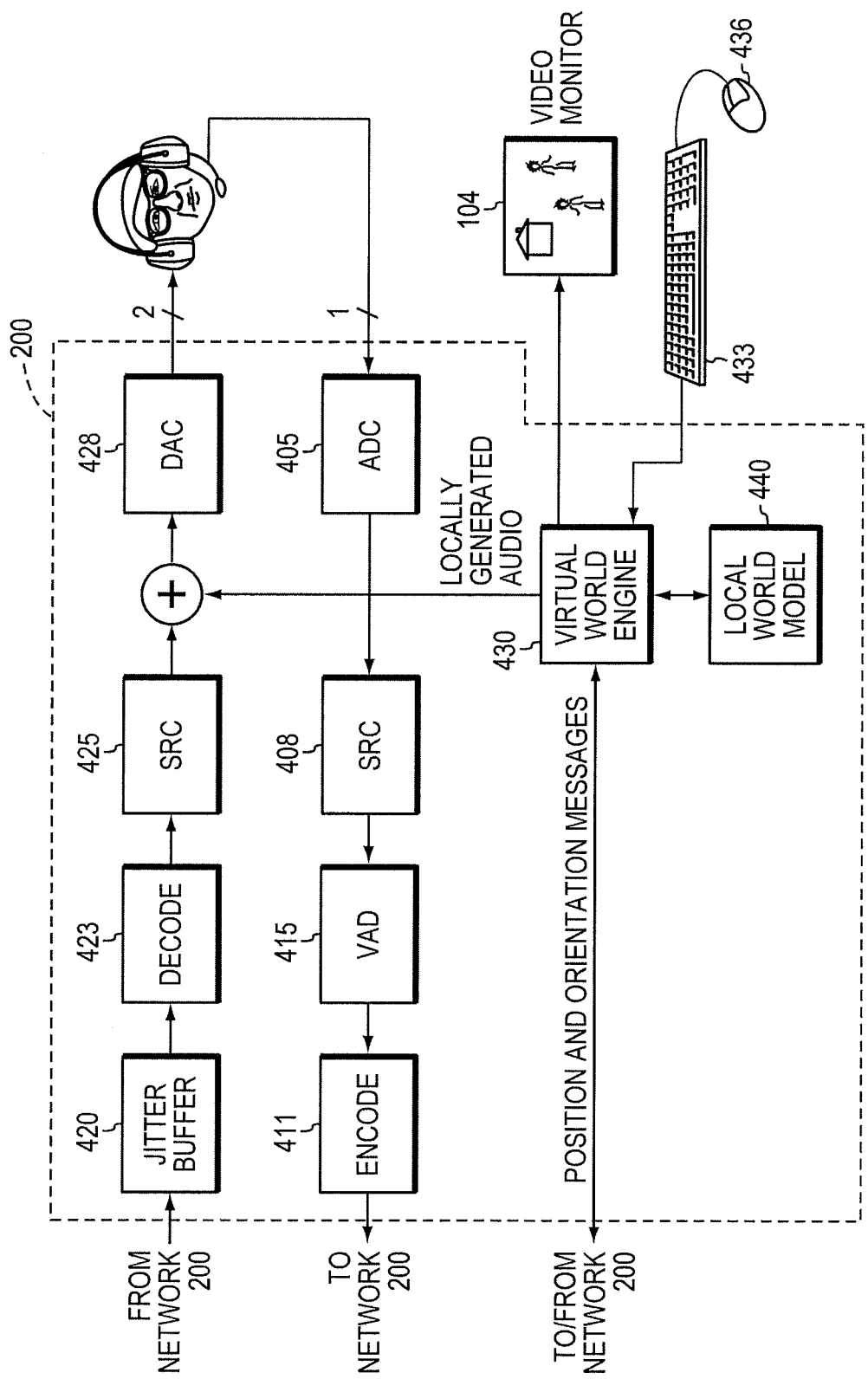
FIG. 4 schematically illustrates a representative client implementation.

FIG. 4 shows a representative implementation of the client 200, i.e., the functionality (typically implemented in software executing as one or more running processes in memory) resident in the PC or other computational device employed by the user—in this case, user A. The basic utility-level functions are well known in the art of voice-over-internet protocol (VOIP) technology. The user's voice is picked up by the microphone 205 and converted to digital pulse-code modulation (PCM) samples by an analog-to-digital converter (ADC) 405, typically operating at 44100 samples/sec. The input samples may be processed by a sample rate converter (SRC) 408 to reduce the sampling rate to typical telephony rates of 8000 samples/sec or 16000 samples/sec, depending on the speech coder in use. Frames of input samples, typically 20 msec in duration, are encoded by a speech coder 411 to reduce size. The coder 411 encapsulates frames in network packets (typically one frame per packet), and the frames are sent to the server (described below) via the network 200 (see FIG. 2). Typically the Real Time Protocol (RTP) is used to transmit media streams such as audio over the internet. RTP packets include a sequence number and a timestamp which allows the receiving end to detect missing packets and to properly order received packets in the case of packets arriving out of order.

The client 200 may also include a voice activity detection (VAD) module 415, which receives packets before the encoder 411. The VAD 415 monitors the input sound level and only encodes packets when the user A is speaking. This results in lower network bandwidth requirements because silent packets are not sent or are encoded using fewer bits. Also, an automatic gain control (AGC) processor (not shown) may be included before the encoder 411 to reduce volume variation in the user's voice and to make the user A clearly audible. Finally, for gaming applications, the voice signal may be processed by a voice modification effect (not shown) to alter or disguise the user's voice.

Packets received by the client 200 from the server are placed in a jitter buffer 420. (As used herein, a buffer refers to a memory partition or dedicated register.) The jitter buffer 420 is desirable because the arrival time of packets may vary substantially, packets may arrive out of order, and packets may be lost (i.e., never arrive). The jitter buffer 420 contains a queue of recently received packets ordered by packet timestamp. As packets arrive, they are placed in proper order in the jitter buffer 420, which may typically hold five packets (representing 100 msec of audio). This allows 100 msec of waiting time for each packet to arrive, at the cost of 100 msec of delay. Many schemes are known in the art for reducing the average latency of jitter buffers and adding "forward error correction" to recover from missing packets.

The oldest packet is read from the jitter buffer 420 and decoded, by a decoder 423, into stereo PCM audio samples. If the sampling rate of the audio coder differs from that of the computer's audio device, the samples are processed by a sample rate converter 425 to match the sampling rates. The sample stream is then summed with sounds from the virtual world, which are locally generated on the client 200. The samples are sent to a digital-to-analog converter (DAC) 428 and presented to the user A over stereo speakers or, preferably, headphones 110 as illustrated. Presentation of binaural audio over speakers is possible by processing the signal with a crosstalk canceller (not shown but well known to those skilled in the art).

The client 200 is under control of a virtual world engine 430, which generates graphics and sound, and receives user-interface commands from the user A via input devices such as a keyboard 433 and mouse 436. These include positional commands that update the position and orientation of the user A in a local world model 440, which is a data structure stored in memory and containing information specifying positions and orientations users in a virtual world. The commands are also sent to the world model server (not shown but described below) via the network 200 where they are forwarded to other clients. The positions of other users are received from the world model server and entered into the local world model, which is used to generate the proper graphics and sound (except speech sound from the other users) for the user A.

The client 200 transmits to the server using a monophonic coder/decoder (codec), and the server sends to the client using a stereo codec. There are many suitable speech and music codecs known in the art. The purpose of codecs is to reduce the size of the data for efficient transmission while maintaining the highest possible fidelity after encoding and decoding. Speech codecs are optimized specifically for speech signals, whereas music codecs are expected to perform well for any type of audio. For server-to-client transmission, embodiments of the invention preferably utilize a stereo speech codec capable of encoding multiple simultaneous speakers while faithfully reproducing binaural localization cues, reverberation, and other environmental effects. It has been found that using two high-quality monophonic speech codecs in a stereo arrangement satisfies these requirements. A stereo music codec may be used, but music codecs typically require a much larger frame size than speech codecs and also require additional time to analyze the input signal; hence the use of music codecs entails additional audio latency, which is undesirable.

3. Generalized Server Implementation

The general single-server implementation is shown in FIG. 5. The illustrated server 500 contains an input processor 503 and a conference processor 506 for every attached client, three of which are shown and indicated as A, B, and C. The input processor 503 receives audio data from the corresponding client, and the associated conference processor 506 creates individualized audio for that client by combining audio data from the input processors 503 of all clients attached to the conference. The audio data is then transmitted back to the client. The server also contains a connection manager 510 and a world model 515.

Figures 6, 7, 8:
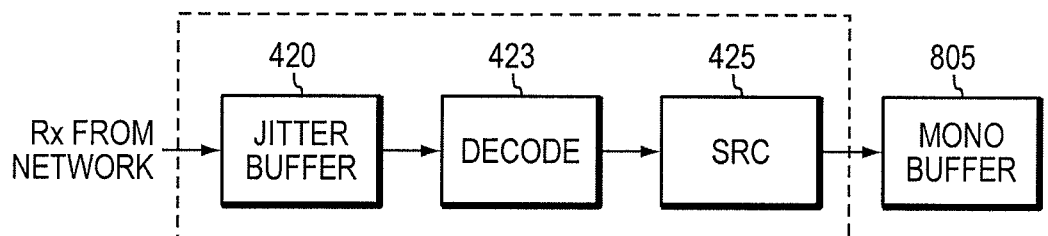
FIG. 6 shows data tables useful in implementing a world model.
FIG. 7 shows a data table mapping connections among users.
FIG. 8 shows a representative input processor for a spatializing server.

As shown in FIG. 6, the world model utilizes a "user position" table in which the position and orientation of each user is recorded. The table is a data structure, stored in non-volatile and/or volatile memory of the server, conceptually organized in tabular form. For each user, the world model also records (in a "room table") the enclosing room, if any, and room characteristics, which minimally include the reverberation time and may include other parameters such as frequency damping (brightness of reverberation). The world model is updated by position and orientation messages sent from the clients. Other information about users, such as team membership, is also recorded in the user information table.

With renewed reference to FIG. 5, the connection manager 510 keeps track of active users and which users are connected to which conferences. This information is summarized in a connection table, shown in FIG. 7. For each user, the table lists the other users he can hear. The connection manager 510 periodically queries the world model 515 to determine if users are within listening distance. Users are disconnected from conferences when they move outside of the listening radius and are connected to conferences when they move within the listening radius. Connections may also be established on the basis of other criteria besides distance, for example, team membership.

The connection manager 510 also handles requests from new users to connect to the virtual world. If the connection is granted, the connection manager 510 creates the appropriate input processor 503 and conference processor 506, and adds the new user to existing conferences within the listening distance. Connections may also be established on the basis of other criteria besides distance, for example, membership in a group.

Figure 25B:
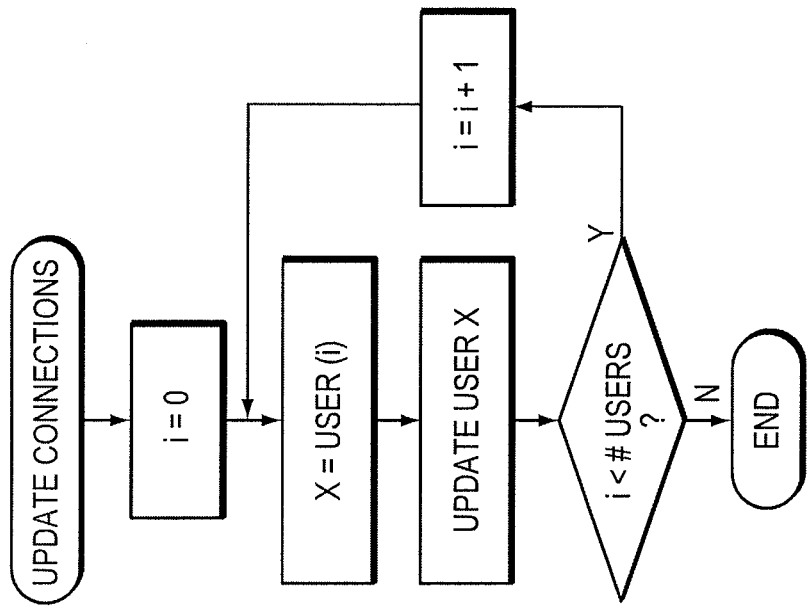
FIGS. 25A-25C are flow diagrams illustrating operation of a connection manager in accordance with the invention.
Figure 25A:
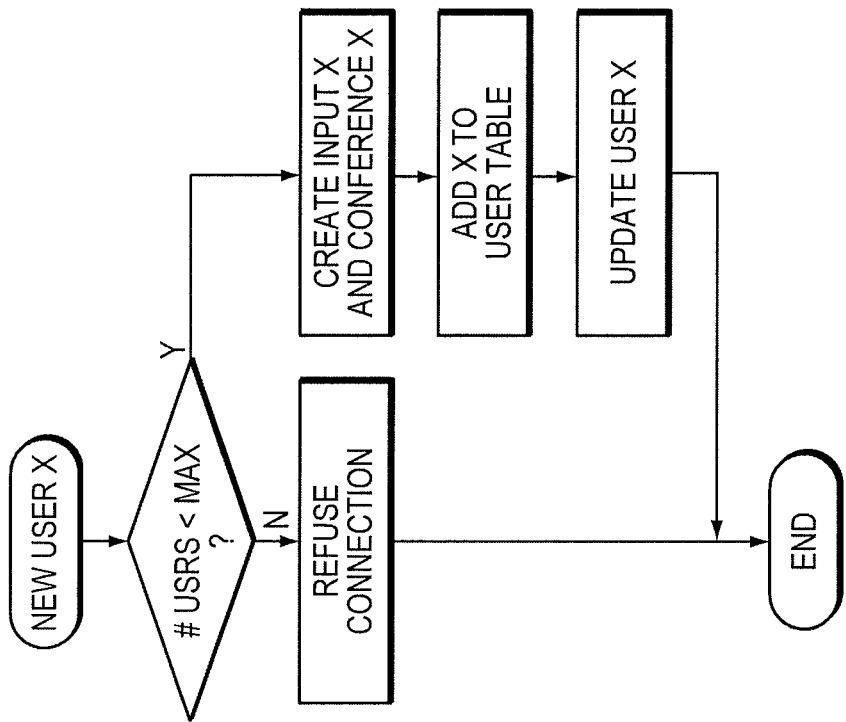
Figure 25C:
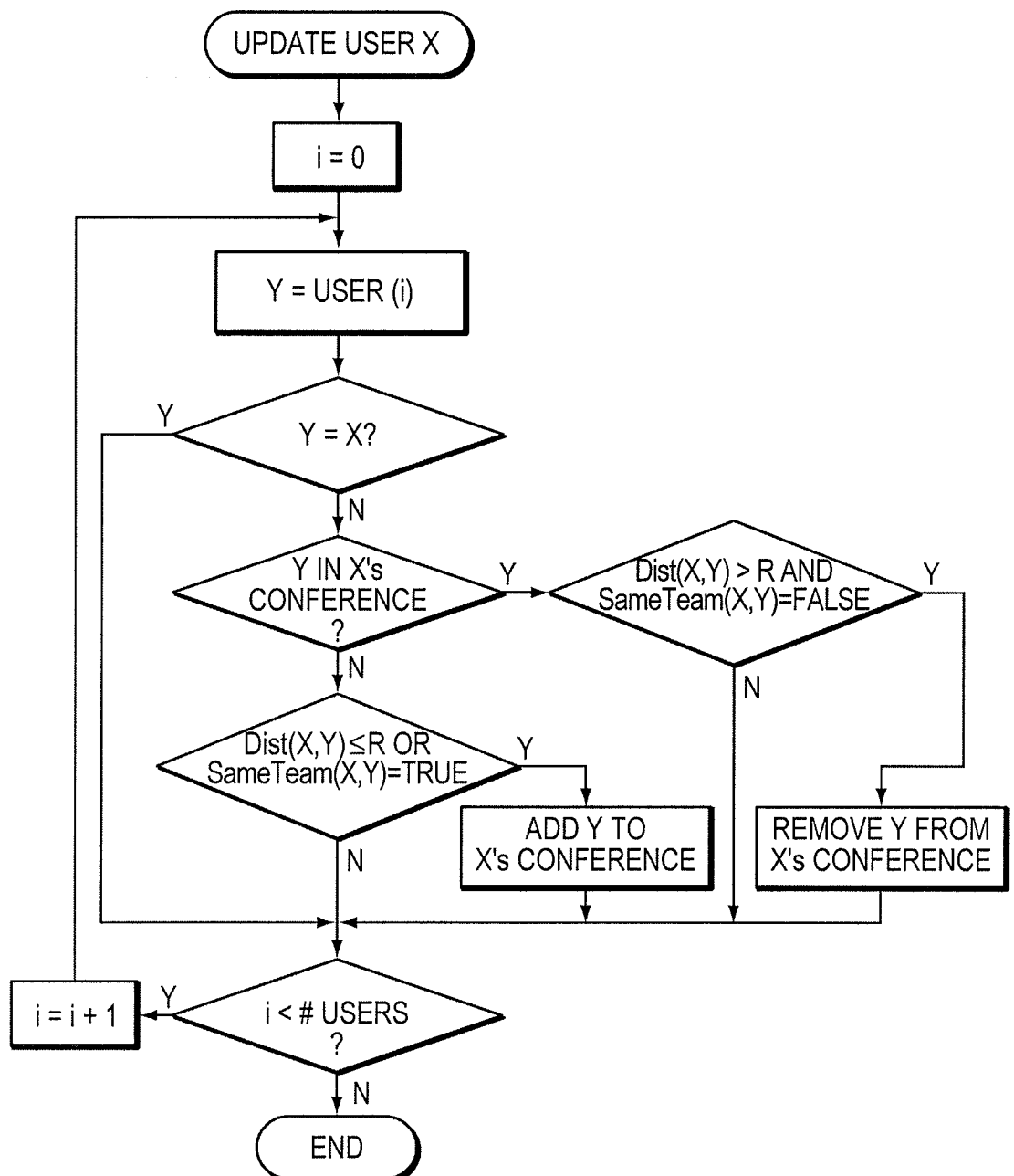

Operation of the connection manager is diagrammed in the flow charts of FIGS. 25A-25C. FIG. 25A illustrates the steps by which a new user is integrated into a conference. If the connection is granted, the connection manager creates the appropriate input processor and conference processor, and adds the new user to existing conferences if within listening distance. FIG. 25B illustrates the steps by which connections are updated for an existing conference. The "Update Connections" procedure iterates the "Update User" procedure for all users X. The Update User procedure in FIG. 25C compares X to all users Y. If Y is already in X's conference, then Y is removed only if Y is beyond listening distance and is not on the same team as X. Otherwise, if Y is not in X's conference, Y is added to X's conference if Y is within listening distance or is on the same team.

4. Spatializing Single-server Implementation

A spatializing server utilizes input processors that decode the audio received from the client into monophonic PCM samples and utilizes conference processors that spatialize and mix the monophonic audio from each connected client, resulting in stereo audio that is sent back to the client. Preferably, clients have stereo playback capability as shown in FIG. 4. For clients that do not have stereo capability, the spatializing server can create a compatible monophonic audio mix for these clients. Although a spatializing server has the general configuration shown in FIG. 5, the operation of the input and conference processors for a spatializing server is described below.

The input processor for user A in a spatializing server is shown in FIG. 8. Incoming audio packets from client A are processed with a jitter buffer 420, decoder 423, and sample rate converter 425 as described above. The resulting monophonic PCM audio samples are stored in a buffer 805 for further processing. Similar processing is performed for each of the clients B and C, with corresponding monophonic buffers to receive the PCM samples.

Figure 9A:
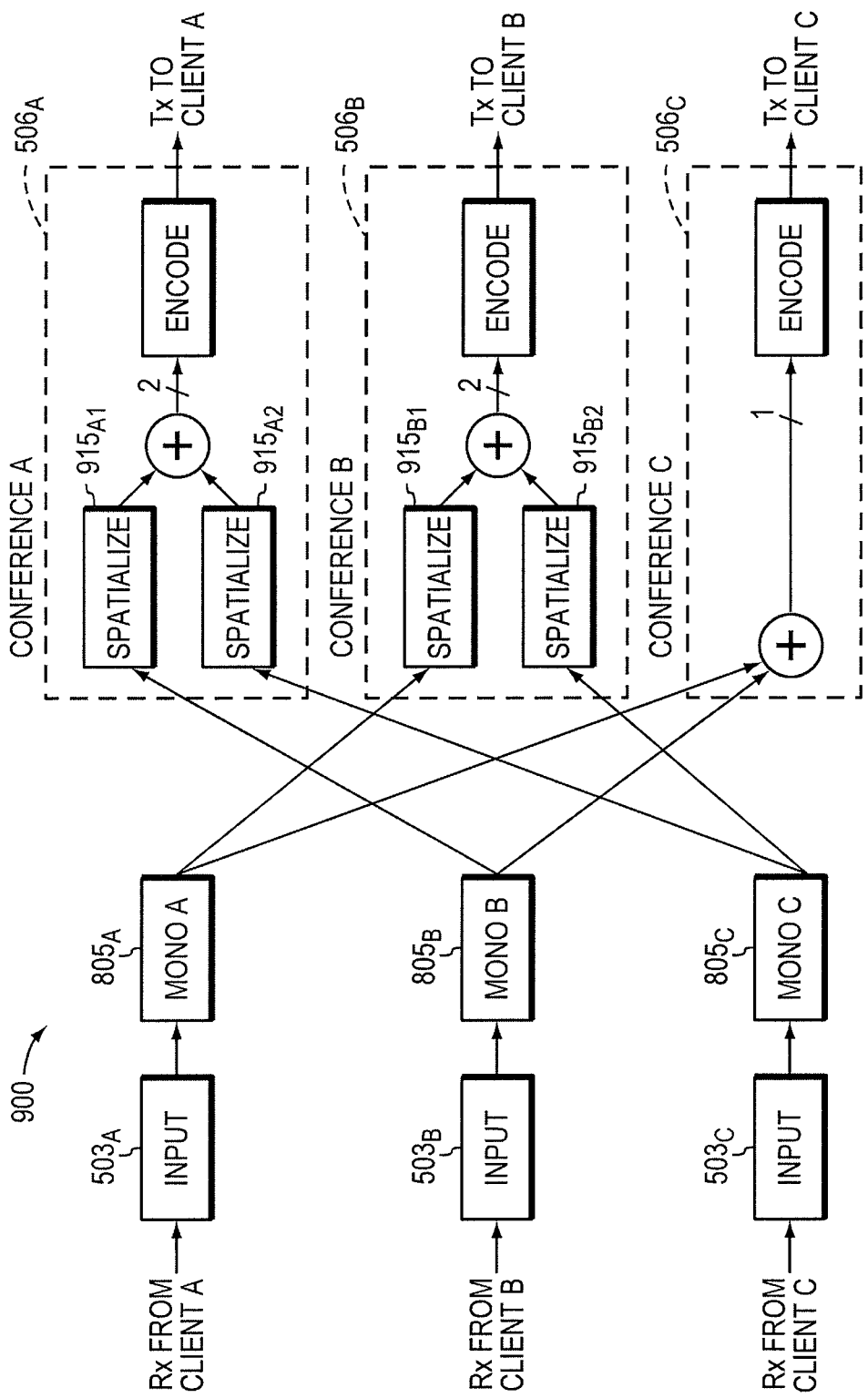
FIGS. 9A-9C show the audio flow through various server implementations.

The audio flow through a server 900 with individualized conference spatialization is shown in FIG. 9A. The input processors $503_A$, $503_B$, $503_C$ are connected to the conference processors $506_A$, $506_B$, $506_C$ via the monophonic buffers $805_A$, $805_B$, $805_C$. Periodically every frame time, typically every 20 msec, the server 900 first processes all inputs to fill the monophonic buffers 805, and then processes all conferences. So in the illustrated embodiment, the server 900 first processes input A, input B, and input C, and then processes Conf A, Conf B, and Conf C, and then this process repeats.

The conference processing in FIG. 9A takes place as follows. User A hears users B and C, so the sources of audio for conference A are taken from the mono buffers $805_B$, $805_C$. Each monophonic input buffer is spatialized to create a stereo signal, the resulting stereo signals are summed, and the stereo sum is encoded and send to client A. Although not shown in the figure, SRC and VAD processing may optionally occur before encoding, as in FIG. 4. Similar processing occurs for client B's conference, which mixes A and C.

The example in FIG. 9A assumes client C is monophonic, i.e., not able to receive stereo audio. The server "knows" which clients are stereo capable based on the audio codec in use; the codec is determined when the client connects to the server. The conference processor for a monophonic client simply sums the monophonic sources for the conference. In the example, a simple monophonic mix is made of A and B and the resulting mono signal is encoded and sent to client C. Stereo clients hear a spatial mix of all other clients, whereas monophonic clients hear a standard monophonic mix without spatialization.

Figure 9B:
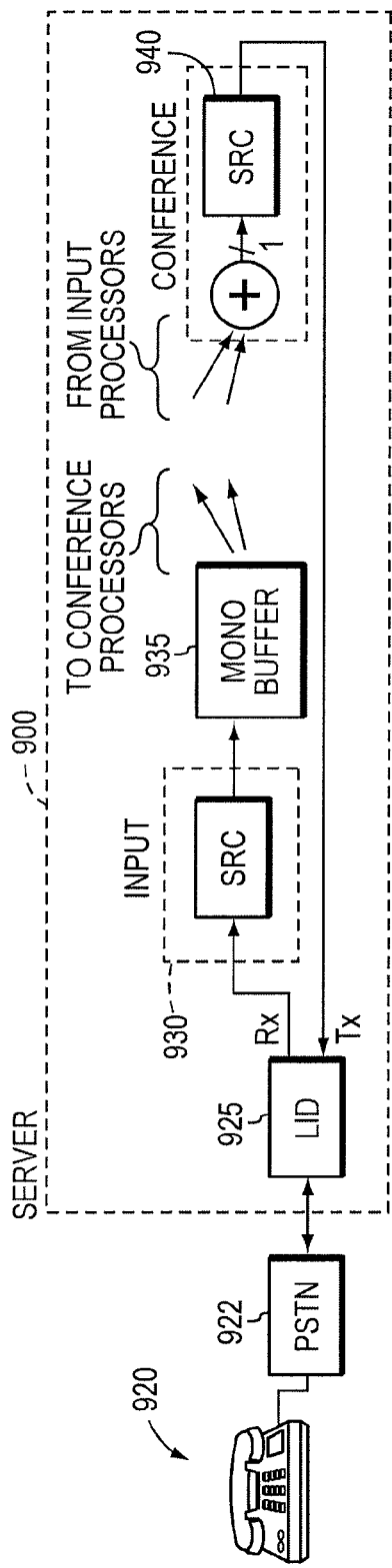

The server 900 can receive calls from telephones if it is equipped with one or more line interface devices (LIDs), which connect the server to the public switched telephone network (PSTN) 922. FIG. 9B shows how a telephone client 920 can connect to the server 900. Audio received by the LID 925 is read as monophonic PCM samples, which are optionally processed by a sample rate conversion (SRC) module 930 and placed in a monophonic buffer 935 for conference processing. The client's conference is formed as a monophonic sum of other clients' buffers. The output is optionally processed by an SRC module 940 and sent to the LID 925 for transmission to the client.

Figure 10:
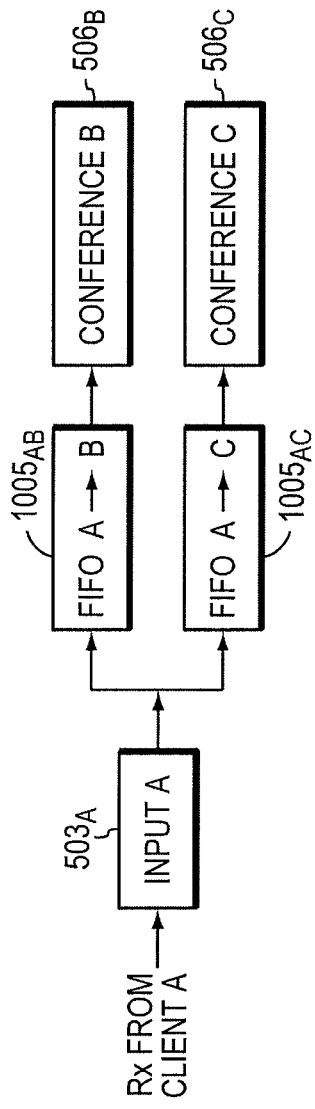
FIG. 10 schematically illustrates the use of FIFO buffers to connect conference processors with input processors.

In this implementation, the input processors 503 are preferably connected to the conference processors 506 using a single buffer to hold one frame of audio data produced by each input processor 503. This requires that all the input processors 503 be run first before the conference processors 506; that is, a single process thread is responsible for executing all the input and conference processors in order. An alternative approach is shown in FIG. 10, in which a separate FIFO (first-in, first-out) buffer is used for each connection between an input processor and a conference processor. In the example, FIFO $1005_{AB}$ is used to connect input A with conference B, and FIFO $1005_{AC}$ is used to connect input A with conference C. Each FIFO buffer has the capacity to buffer a small number of frames of audio data, e.g., from 2 to 10 frames. When the input processor $503_A$ runs, it writes a frame to the appropriate FIFO, and when the corresponding conference processor $506_A$ runs, it reads the oldest frame in the FIFO. Initially after creation, the FIFO buffers 1005 prime themselves by filling with input frames until the FIFOs 1005 are half full; during priming, FIFO reads from the conference processors are fulfilled by returning frames of zeroes (silence). After the FIFO is primed, read requests are fulfilled by returning the oldest frame in the FIFO. The FIFO connection technique is preferred when the various input processors and conference processors are running periodically, but asynchronously, so the order of execution is not known a priori. This would occur if, for example, all the input processors and conference processors were executed by different process threads on the server, which may be preferred on a server with multiple CPUs. In this case, the individual FIFO buffers ensure that each conference processor retrieves the correct input audio data regardless of the order of execution of the input and conference processors. The multithreaded implementation incurs additional audio latency caused by the FIFO buffering.

Figure 11:
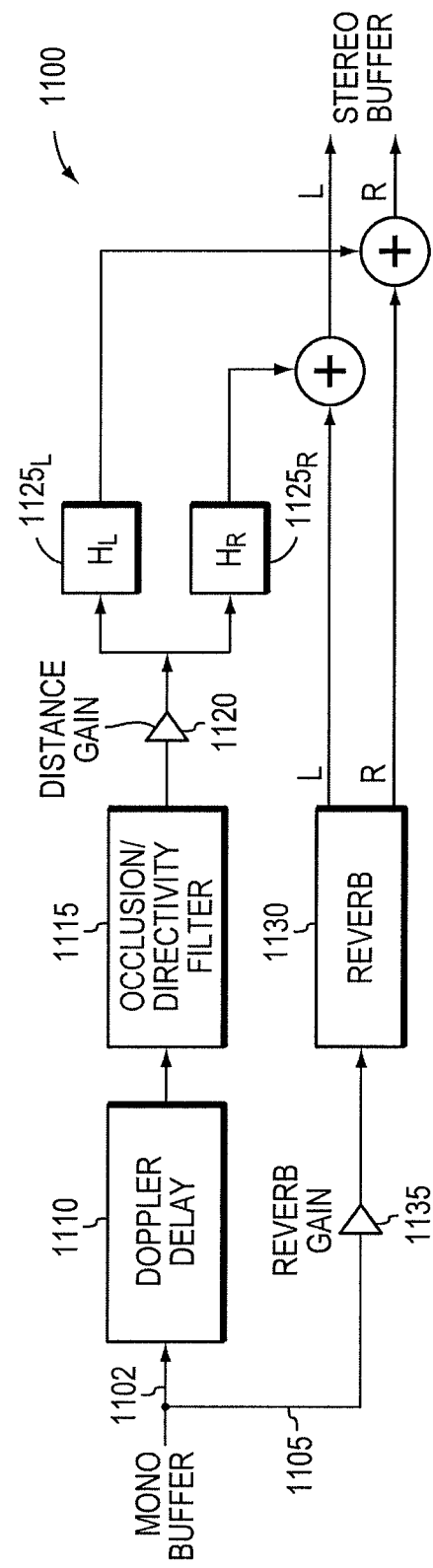
FIG. 11 schematically illustrates a representative spatialization processor.

A representative spatialization processor 1100 is shown in FIG. 11. The monophonic source is split into a direct path 1102 and a reverb path 1105. The direct path 1102 models the sound propagation from the source to the listener, and is processed by a variable delay line whose delay corresponds to the air propagation time between the source and the listener. This delay also models the Doppler motion effect using a Doppler delay filter 1110. When the distance between the source and the listener changes rapidly, the changing delay will naturally impart a pitch shift to the sound. After the Doppler motion delay the sound is processed by an occlusion/directivity filter 1115, i.e., a digital equalizer, to model occlusion and source directivity effects. For example, a source behind an occluding wall might be muffled by a filter that reduces high frequencies. After the filter 1115, the sound is scaled by a gain module 1120 according to the distance between the source and the listener. The scaled sound is then spatialized by filtering with a pair of head-related transfer functions (HRTFs) $1125_L$, $1125_R$, which reproduce spatial localization cues. Filtering with the HRTFs 1125 produces binaural stereo outputs. Along the reverb path 1105, the monophonic input sound is processed by a reverberator 1130 through a reverb gain module 1135 whose value depends on the reverberant qualities of the virtual space and the distance between the source and the listener. The stereo reverb output is summed with the binaural output from the direct path. The final stereo output will sound like the input sound localized at a desired direction, at a desired distance, with environmental effects such as Doppler shift, object occlusion, and room reverberation. Additional audio effects may be applied to each conference input in series with the delay and occlusion filter. As described earlier, one such audio effect may simulate the sound of a virtual communications device such as a walkie talkie.

Reverberation is particularly important. Spatialized audio that lacks reverberation is often perceived as being inside or near to the head of the listener; adding reverberation enables externalized perception. Spatial teleconferences that include reverberation sound like the users are sharing an acoustical space, rather than simply sharing a headset transducer. Reverberation imparts useful cues as to the surrounding space, so it is an important audio effect to faithfully recreate a believable virtual world.

Figure 12:
FIG. 12 shows how position and orientation messages are sent to the world model on the server.

FIG. 12 shows how each client sends position and orientation messages to the world model on the server. Periodically, each conference processor queries the world model to determine world parameters relevant to the conference and uses these to update the spatial and environmental parameters. For example, the A conference uses the positions of A, B, and C, and the orientation of A, to determine the relative positions of B and C. The relative positions determine the HRTFs, the distance gains, Doppler delays, and occlusion filters for the spatializers in FIG. 9A. The parameters of the enclosing room are used to update the reverberation parameters.

5. Spatializing Single-server with Shared Viewpoint

As shown in FIG. 9A, the conference processors 506 for stereo clients A and B have spatializers 915 for each input. This allows each user to have a unique viewpoint based upon his or her location in the virtual world. However, it is computationally expensive to run a spatializer for every input of every conference. A more efficient server implementation uses a single spatializer per connected participant; this results in a conference where the perceived location of a participant is the same for all other participants regardless of the position or orientation of the other participants. Hence, all participants share the same auditory viewpoint with respect to the virtual world.

Figure 13:
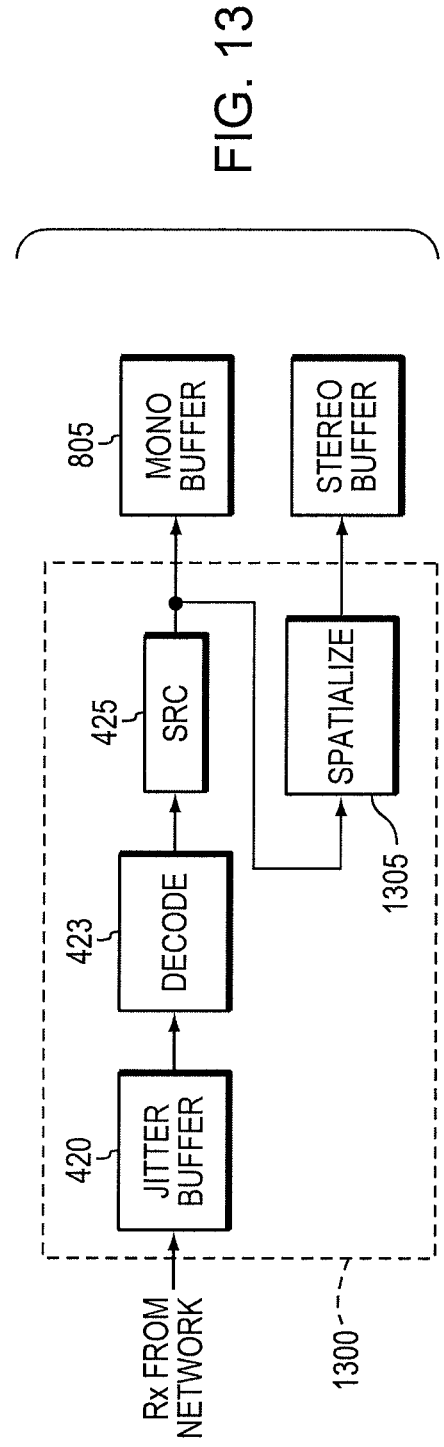
FIG. 13 schematically illustrates an input processor with spatialization.
Figure 14:
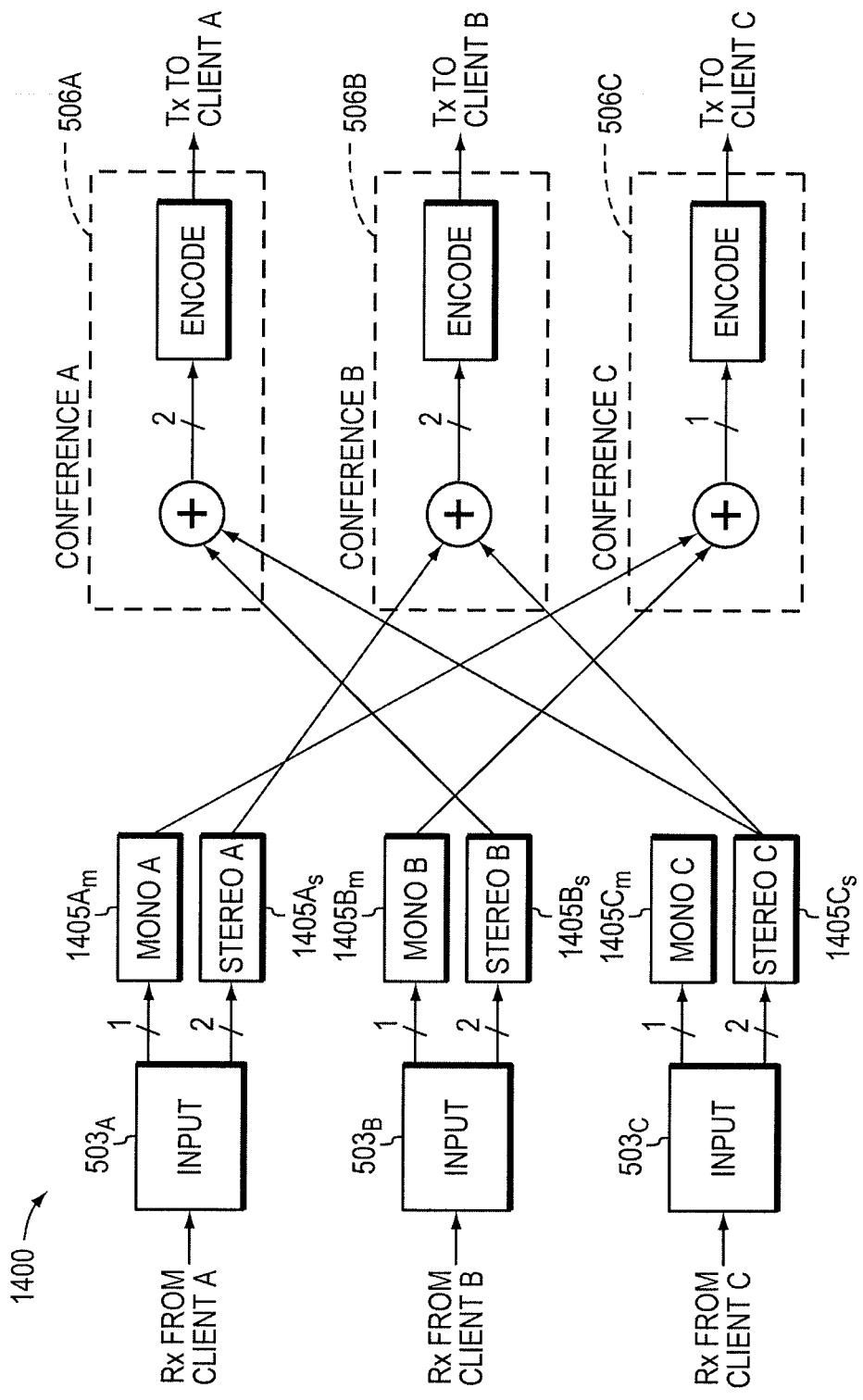
FIG. 14 schematically illustrates a server with shared viewpoint spatialization.

FIG. 13 shows an input processor 1300 where the monophonic signal is processed by a spatializer 1305 to produce a spatialized stereo output. The audio flow through a server 1400 with shared viewpoint spatialization is shown in FIG. 14. Each input processor $503_A$, $503_B$, $503_C$ feeds a corresponding mono buffer $1405_{AM}$, $1405_{BM}$, $1405_{CM}$ and stereo buffer $1405_{A_S}$, $1405_{B_S}$, $1405_{C_S}$. The conference processors 506 simply sum the mono or stereo buffers from each participant attached to the conference. For example, conference A sums the stereo buffers from clients B and C, and conference B sums the stereo buffers from A and C. The stereo sum is encoded and send to the client. Although not shown in the figure, SRC and VAD processing may optionally occur before encoding, as in FIG. 4. As with the implementation in FIG. 9A, client C is a monophonic client and hence sums the monophonic buffers from A and B.

Figure 9C:
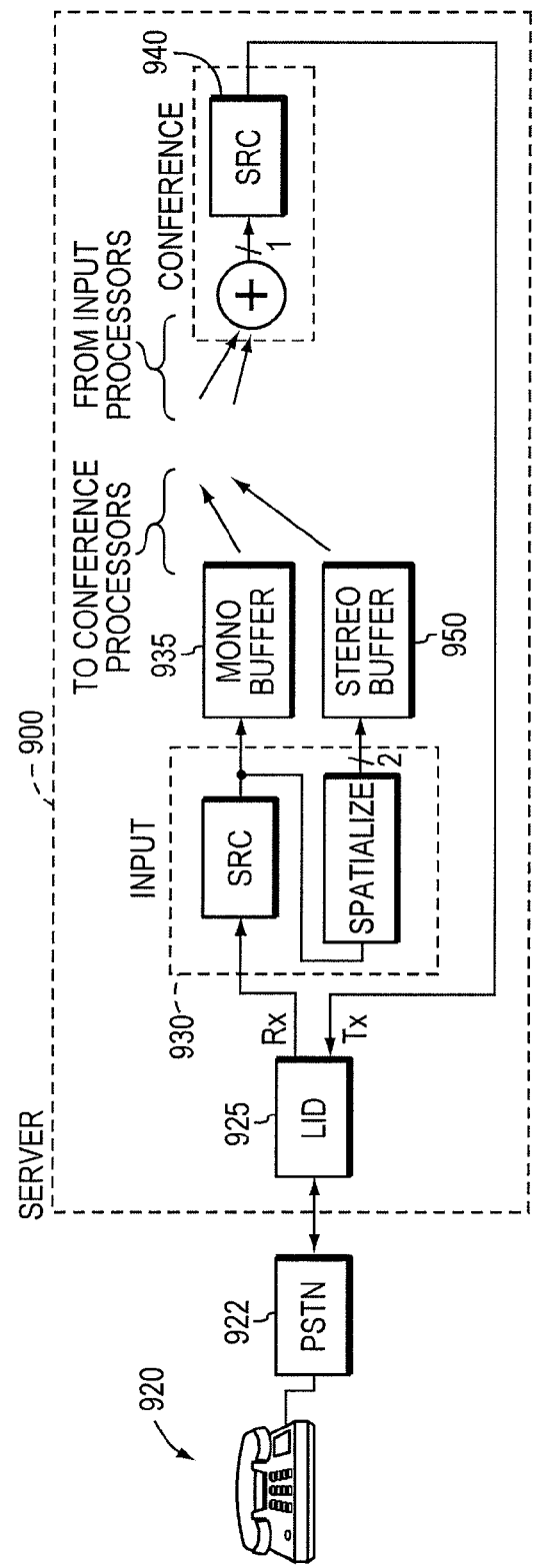

As shown in FIG. 9C, the spatializing server 900 can receive calls from telephones if it is equipped with one or more LIDs 925 which connect the server 900 to the PSTN 922. Audio received by the LID 925 is read as monophonic PCM samples which are optionally processed by the SRC module 930 and placed in the monophonic buffer 935. The monophonic samples are also spatialized to create a stereo buffer 950. The telephone client's conference is formed as a monophonic sum of other clients' monophonic buffers. The output is optionally processed by SRC 940 and sent to the LID 925 for transmission to the client.

This server implementation is preferred for simple conferencing applications where it is not necessary to provide individualized auditory viewpoints into the virtual world. This may be used, for example, in audio conferencing applications without a visual component or conferencing applications where the visual world model shown to each user displays the locations of all other users from the shared viewpoint.

6. Single-server Implementation, Spatialization on Client

One disadvantage of spatializing on the server is the delay in updating the spatial locations and orientations of the participants. Messages must be sent from the client to the server to update these parameters, and then the spatial audio incorporating these changes is sent back to the client. It may take hundreds of milliseconds for the audio presented at the client to incorporate the updated parameters. This is a problem for fast-moving games viewed from the player's perspective. If, for example, the player rotates 90 degrees to the right, then the spatialized locations of all audio sources must rotate 90 degrees to the left to remain anchored to the external world. If this change requires hundreds of milliseconds, there will be an objectionable lag.

To reduce the latency in parameter updating, the spatialization of other players' speech can be performed on the client, as it is for the locally generated game audio. This requires that the client receive separate speech signals for each connected participant, which is facilitated using a multiple-channel transmission format from the server to the client. The multiple-channel transmission format utilizes the encoded frame for each channel concatenated into a single multiple-channel frame as shown in FIG. 15. Preceding the data for each channel is a length field that specifies the number of bytes in the following data. It is generally necessary to specify the lengths because the frame lengths for each channel can vary over time (due, for example, to VAD processing). Typical codec frames are less than 256 bytes, so a single 8-bit byte can be used to specify the length of the subsequent frame. The example shown in FIG. 14 is for two channels (stereo audio), but any number of channels can be supported by appending additional frames. The multiple-channel frame data is easily unpacked into separate channels as shown in FIG. 16. Implementation is simplified if all channels of the multi-channel format use the same codec at the same sampling rate, otherwise an additional field per channel is added to identify the codec and sampling rate.

Position messages and other game-play events may be sent separately using a reliable protocol such as TCP rather than with the audio data, which may be sent using an unreliable protocol such as UDP. Each client has a local world model 440 that is updated by network messages from the server 500. This approach is well-known in conventional multiplayer games, which have mechanisms for updating user positions on each client. Alternatively, each client can transmit its locally represented position and orientation with each speech packet, in which case a client can update its local world model with respect to another participant each time it receives a packet from that participant, spatializing the participant's speech based on the updated local world model.

A spatializing client 1700 is shown in FIG. 17. The multi-channel frames are received from the network like any media frames and go into a jitter buffer 420 for sorting into the proper time sequence. The frames are extracted from the jitter buffer, unpacked into separate channels by an unpack stage 1705, and then each channel is decoded (by decoders 1710) into monophonic audio and spatialized (by spatializers 1715). The spatialized signals are summed with the other game audio, converted to analog by a DAC 1720, and presented to the user over headphones. Sample rate conversion (SRC) is not shown in the figure. If SRC is needed, it is typically applied after the decode stage, but if the game audio is running at a higher sampling rate than the speech coder, it is more efficient to apply SRC after the spatializers are summed, thus allowing the spatializers to run at a reduced sampling rate.

Figures 18, 19:
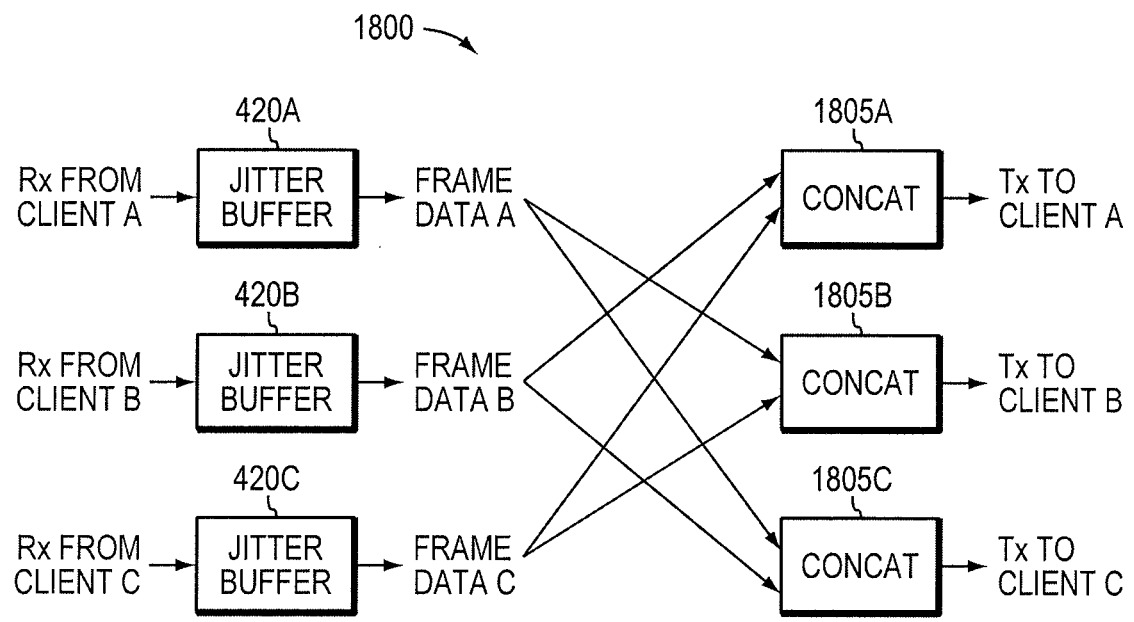
FIG. 18 schematically illustrates a server configured for operation with spatializing clients.
FIG. 19 shows a channel mapping table for use by a client in accordance with some embodiments of the present invention.

When spatialization is performed on the client, the operation of the server is greatly simplified. Rather than decoding, spatializing, mixing, and encoding audio, the server need only duplicate and route encoded audio frames to the proper clients. FIG. 18 shows such a simplified server 1800, which is configured primarily for routing. Encoded audio frames received from each client are placed in a jitter buffer 420 for time sorting. Periodically, e.g., once each frame time, the server 1800 reads a frame of data from each jitter buffer 420. Catenation modules 1805 concatenate the frames to form the multi-channel frames to transmit to the clients. In the illustrated embodiment, client A is connected to clients B and C, so the output frame for client A is a concatenation of the frame from client B and the frame from client C. In the routing server 1800, the jitter buffers 420 act as input processors and the catenators 1805 act as conference processors.

The number of participants connected to a conference is limited by the number of channels the client can receive and spatialize. When the client initially connects to the server, the client informs the server of the codec formats it can receive, including the maximum number of channels, and the server chooses a codec format. This establishes the number of channels in the connection. As users are connected or disconnected from the conference, different users may occupy different channels in the audio stream. The server notifies the client via a network message that a certain channel corresponds to a certain user. The client records this information in a channel mapping table as shown in FIG. 19; the channel mapping table is stored as a data structure in nonvolatile client memory. For example, if channel 0 corresponds to user B, then channel 0 is spatialized using the position of user B.

Changes in the channel mapping table should be synchronized with the media flow to prevent briefly incorrect spatialization when a channel switches users. This can be accomplished by means of a sequence number in the channel frame data that is incremented every time the channel's user changes. The sequence number is sent to the client in the channel assignment message, and the client will wait for the proper sequence number in the received data before switching to the new user's spatialization parameters.

The combination of a plurality of spatializing clients communicating with a single routing server represents a preferred implementation for fast-action games where the users have a first-person viewpoint in the virtual world. The spatializing client can respond quickly to user position and orientation changes, independent of the latency in the speech signals themselves. This performance increase comes at the cost of increased CPU demands for decoding and spatializing multiple channels, and increased network bandwidth requirements for receiving multi-channel data. However, because the server need not perform decoding, spatializing, mixing, or encoding, it can handle a much larger number of connections than a spatializing server.

7. Multiple-server Implementation

A single server may not have enough processing capacity to handle a very large number of users. Instead, multiple servers may be used, with each server handling a small number of conferences. A master server may maintain the world model and control the servers that actually process the conferences; these servers are herein referred to as conference servers. The conference servers can be arranged in a "blade" configuration where additional servers (or server capacity) can be activated to increase conferencing capability, or deactivated when the need for capacity diminishes.

Figure 20:
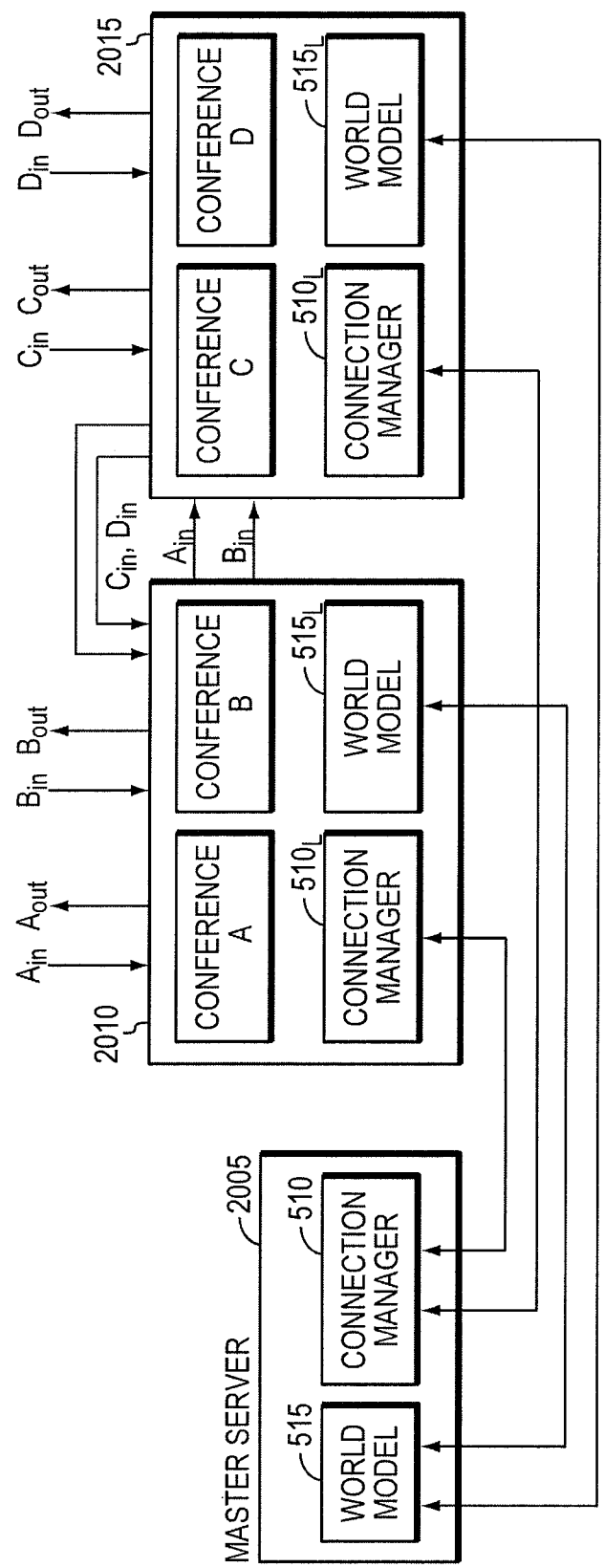
FIG. 20 schematically illustrates a server configuration including master server and an plurality of conference servers.

FIG. 20 shows a master server 2005 and two conference servers 2010, 2015 processing four users A, B, C, and D, which are all interconnected. Server 2010 handles conference A and B, while server 2015 handles conference C and D. The master server 2005 does not handle any conferencing.

The master server 2005 contains the world model 515 and the connection manager 510. The world model maintains the world state as described earlier and illustrated in FIG. 6. The connection manager 510 keeps track of which servers are handling which conferences, and includes the tables shown in FIG. 21. Specifically, the user table has an entry for each connected user; the entry lists the users in the conference and the server that is running the conference. The server table lists available servers and the conferences running on each server. For large number of participants, the functions of the master server are preferably implemented on a separate computer; however, it is possible to implement the master server functions on one of the conference servers.

Figures 21, 22, 23:
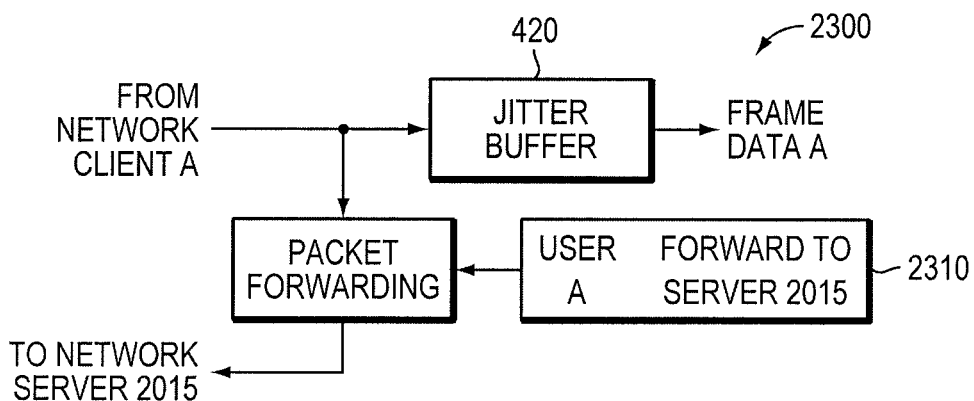
FIG. 21 shows data tables used by a master server as illustrated in FIG. 20.
FIG. 22 shows data tables used by a conference server as illustrated in FIG. 20.
FIG. 23 schematically illustrates a forwarding input processor used by a conference server as illustrated in FIG. 20.

Each conference server has a local world model $515_L$ and a local connection manager $510_L$, which duplicates the subset of information on the master server applicable to the particular conference server. Each local world model $515_L$ records the information for the users connected to the local conferences. The local world model $515_L$ on each server is periodically updated from the master world model 515 via network messages from the master server 2005 to each conference server 2010, 2015. The local connection manager $510_L$ maintains a table for each active conference on the server as shown in FIG. 22. Each table lists the users attached to the corresponding conference, and the associated server for each user's conference.

Incoming connections to the virtual world are directed at the master server 2005. When a user attempts to connect to the virtual world, the master server 2005 examines the server table (FIG. 21) and determines if there is an available server to run the conference for the user. If not, the connection is refused. Otherwise, the connection manager 510 establishes a conference for the user on the selected server. This means that a bidirectional network voice data stream is established between the user and the conference server.

Preferably, each connected user sends positional information to the master server 2005, where it is used to update the world model 515, and this information is propagated to the appropriate conference server world models $515_L$. Similarly, the positional information from each user may be sent to the user's conference server and then uploaded to the master server 2005, which then forwards the information to the other servers.

Because the conference tasks are distributed across multiple servers, each server may not have a direct connection with the users needed to create the conferences running on the server. Accordingly, each server duplicates and forwards the incoming voice data streams to other servers that need them. This is accomplished by a forwarding input processor 2300, illustrated in FIG. 23, which each conference server incorporates. Incoming voice packets are optionally duplicated and forwarded to other servers prior to processing by the jitter buffer 420. The forwarding is controlled by a forwarding table 2310 maintained by each server's connection manager $510_L$. The forwarding table 2310 has an entry for each user connected to the server; each entry lists all the servers that need a copy of a particular user's voice stream. The illustrated example shows the input processor for user A on server 2015 (see FIG. 20). In this case, the packets are forwarded to server 2015, which has conferences that include user A.

Figure 24:
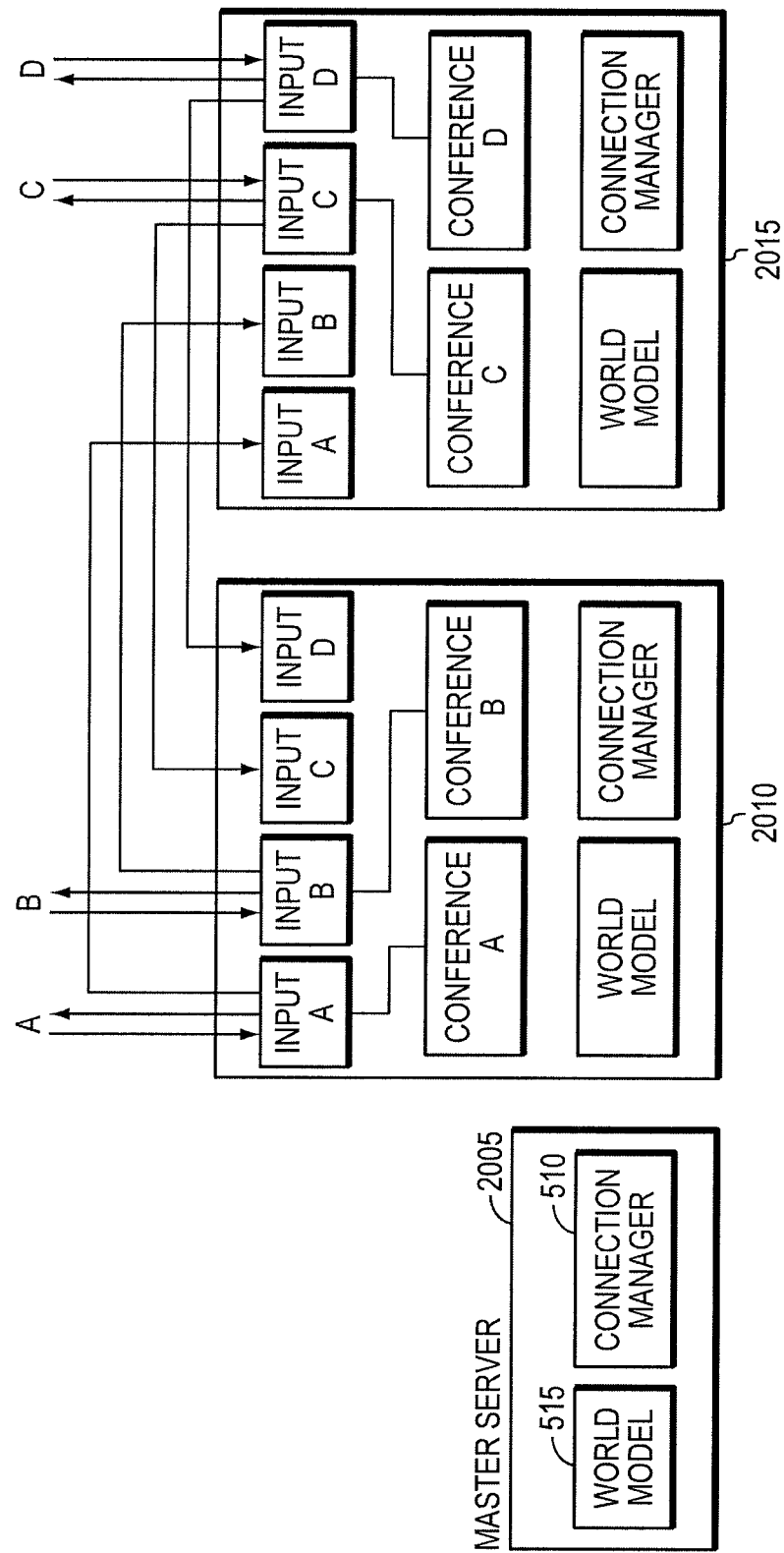
FIG. 24 shows exemplary data flows among the components shown in FIG. 20.

A complete picture of voice stream routing is shown in FIG. 24, using the example of four users A, B, C, and D, all of whom can hear one another, with server 2010 handling conferences A and B, and server 2015 handling conferences C and D. As illustrated, the input processor for conference A duplicates and forwards the incoming packets to server 2015. Each server 2010, 2015 has an input processor for each user heard in a conference on the server. Each conference processor, in turn, transmits its output to the corresponding user. The input processor for this user also resides on the transmitting server, even if it is not needed on this server (since a conference for user X will not contain user X's voice).

As users move about in the virtual world, they are dynamically connected and disconnected from the conferences of nearby users. This is controlled by the master server 2005. The master server's connection manager 510 periodically examines the world model 515 and determines, for each user X, which users, if any, must be added to X's conference and which users, if any, must be disconnected from X's conference. As discussed earlier, other criteria may also be used to determined which users should be connected to user X's conference. The connection manager 510 implements any changes in user X's conference by sending messages to the conference servers that update the state of the local connection managers.

For example, with reference to FIG. 24, consider what would happen if user B is disconnected from user C's conference. On server 2015, user B is removed from the conference C table, which causes the conference C processor to no longer accept audio from input B. However, the packet forwarding of B from server 2010 to server 2015 is still needed by conference D. Now consider that B is disconnected from conference D. On server 2015, the D conference processor no longer accepts audio from input B. Because server 2015 no longer needs the B input, the B packet forwarding connection from server 2010 to server 2015 is disconnected. The B input processor on server 2015 is deleted and the forwarding table on server 2010 is updated to eliminate B forwarding to server 2015. If user B is later reconnected to a conference on server 2015, then the forwarding connection will be established anew by updating the forwarding table on server 2010 and creating the input processor on server 2015.

To summarize, arbitrary connections and disconnections between users are accommodated by changing the local connection state on the servers 2010, 2015, which as a side effect may involve the creating/deleting of input processors, changing connections in the conference processors, and updating the forwarding tables.

It should be emphasized that the functionality of the present invention may be realized in hardware or software, or a combination of both on a general-purpose computer. Programs embodying such functionality may be written in any one of a number of high-level languages, such as FORTRAN, PASCAL, C, C++, C#, Java, Tcl, or BASIC. Further, programs can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A spatial sound conferencing server comprising:
an input processor for receiving audio and position and orientation information from at least one network client;
a conference processor for spatializing the audio according to the received position and orientation information;
an output interface for transmitting the spatialized audio to the at least one network client; and
a connection manager, in operative communication with the conference processor, for defining conferences associated with each client, the audio mix transmitted to a client corresponding to a conference associated with that client, wherein:
the input processor receives audio and position and orientation information from a plurality of network clients, the conference processor creating, for each client, a mix of audio from other clients spatialized according to the received position and orientation information;
the positional information is represented in a world model;
each client corresponds to a user;
for a first client, the associated conference comprises audio from other clients corresponding to users who are proximate to the first-client user in the world model; and
the conference processor comprises means for spatializing the audio by:
modeling a Doppler motion effect by delaying sound to the first client by a time proportional to a distance between the first-client user and a sound source as represented in the world model;
filtering to model object occlusion;
scaling by a gain inversely proportional to the distance between the listener and the sound source to model distance cues;
filtering by a pair of HRTFs to encode localization cues; and
summing the resulting stereo signal with stereo reverberation.

2. The conference server of claim 1 wherein the conference processor comprises a single spatializer per network client.

3. The conference server of claim 1 wherein the conference processor comprises a dedicated spatializer for each participant in each conference handled by the conference server.

4. The conference server of claim 1 comprising a plurality of blade servers, each blade server being dedicated to one or more conferences and comprising (i) a local world model containing position and orientation information received from participants in the one or more conferences; and (ii) a conference processor for spatializing the audio according to the local world model.

5. A method of spatializing sound, the method comprising the steps of:
receiving, on a server, audio and position and orientation information over a network from at least one network client;
spatializing the audio according to the received position and orientation information;
transmitting the spatialized audio to the at least one network client;
receiving audio and position and orientation information from a plurality of network clients and creating, for each client, a mix of audio from other clients spatialized according to the received position and orientation information; and defining conferences associated with each client, the audio mix transmitted to a client corresponding to a conference associated with that client, wherein positional information is represented in a world model;

each client corresponds to a user;

the positional information is represented in a world model;

for a first client, the associated conference comprises audio from other clients corresponding to users who are proximate to the first-client user in the world model; and audio is spatialized by:
  modeling a Doppler motion effect by delaying sound to the first client by a time proportional to a distance between the first-client user and a sound source as represented in the world model;
  filtering to model object occlusion;
  scaling by a gain inversely proportional to the distance between the listener and the sound source to model distance cues;
  filtering by a pair of HRTFs to encode localization cues; and
  summing the resulting stereo signal with stereo reverberation.

* * * * *